United States Patent
Takashima et al.

(10) Patent No.: US 9,313,088 B2
(45) Date of Patent: Apr. 12, 2016

(54) NETWORK SYSTEM AND NETWORK MANAGING METHOD

(75) Inventors: Masanori Takashima, Tokyo (JP); Kase Tomohiro, Tokyo (JP); Ueno Hiroshi, Tokyo (JP); Masuda Takahisa, Tokyo (JP); Yun Suhun, Tokyo (JP)

(73) Assignee: NEC CORPORATION, Tokyo (JP)

( * ) Notice: Subject to any disclaimer, the term of this patent is extended or adjusted under 35 U.S.C. 154(b) by 218 days.

(21) Appl. No.: 13/821,932

(22) PCT Filed: Sep. 7, 2011

(86) PCT No.: PCT/JP2011/070333
§ 371 (c)(1),
(2), (4) Date: Mar. 8, 2013

(87) PCT Pub. No.: WO2012/033117
PCT Pub. Date: Mar. 15, 2012

(65) Prior Publication Data
US 2013/0166720 A1    Jun. 27, 2013

(30) Foreign Application Priority Data

Sep. 9, 2010    (JP) .................................. 2010-202444

(51) Int. Cl.
*H04L 12/24* (2006.01)
*H04L 29/12* (2006.01)
(Continued)

(52) U.S. Cl.
CPC .......... *H04L 41/00* (2013.01); *H04L 41/0806* (2013.01); *H04L 45/38* (2013.01); *H04L 61/10* (2013.01); *H04L 61/103* (2013.01); *H04L 47/20* (2013.01)

(58) Field of Classification Search
CPC ......... H04L 45/38; H04L 45/42; H04L 41/00; H04L 41/0806; H04L 47/20; G06F 2009/4557; G06F 9/4856; G06F 9/4862; G06F 9/4868; G06F 9/4875; G06F 9/5088
See application file for complete search history.

(56) References Cited

U.S. PATENT DOCUMENTS 7,000,027 B2    2/2006 Hensbergen
7,047,315 B1    5/2006 Srivastava
(Continued)

FOREIGN PATENT DOCUMENTS

CN          101682748 A        3/2010
WO     WO 2010/090182 A1      8/2010

OTHER PUBLICATIONS

Tavakoli, Arsalan, Casado, Martin, Koponen, Teemu, Shenker, Scott, "Applying NOX to the Datacenter", Oct. 22, 2009, HotNets VIII, http://conferences.sigcomm.org/hotnets/2009/papers/hotnets2009-final103.pdf.*

(Continued)

*Primary Examiner* — Chris Parry
*Assistant Examiner* — Daeoo Lee
(74) *Attorney, Agent, or Firm* — Sughrue Mion, PLLC

(57) ABSTRACT

A controller completes the setting of a flow entry to a switch previously before the communication of a virtual machine starts. Specifically, the controller sets information of the virtual machine and information of a server on which the virtual machine operates. The controller detects the information of the server under the switch through the switch. When the set server information and the detected server information match to each other, the controller sets a flow entry for a packet destined to the virtual machine to the switch based on information of the virtual machine on the server. After that, the virtual machine starts communication.

13 Claims, 5 Drawing Sheets

(51) Int. Cl.
*H04L 12/721* (2013.01)
*H04L 12/813* (2013.01)

(56) References Cited

U.S. PATENT DOCUMENTS

| | | | |
|---|---|---|---|
| 2003/0101273 A1 | 5/2003 | Hensbergen | |
| 2005/0210098 A1* | 9/2005 | Nakamichi et al. | 709/203 |
| 2006/0130064 A1 | 6/2006 | Srivastava | |
| 2009/0138577 A1* | 5/2009 | Casado et al. | 709/220 |
| 2010/0322255 A1* | 12/2010 | Hao et al. | 370/398 |
| 2011/0090911 A1* | 4/2011 | Hao et al. | 370/395.53 |
| 2011/0289230 A1 | 11/2011 | Ueno | |
| 2014/0223024 A1 | 8/2014 | Wogsberg et al. | |

OTHER PUBLICATIONS

Taiwanese Office Action dated Apr. 18, 2014 with English translation of relevant portion.
PCT/ISA/237 ( English translation of written opinion of the international searching authority, dated Nov. 1, 2011).
PCT/IB/373
Canadian Office Action dated Feb. 20, 2015.
Erickson, et al. "A Demonstration of Virtual Machine Mobility in an OpenFlow Network", SIGCOMM '08, Aug. 17-22, 2008, 1p. (http://yuba.stanford.edu/~nickm/papers/p513-ericksonA.pdf).
International Search Report (ISR) (PCT Form PCT/ISA/210) dated Nov. 1, 2011, in PCT/JP2011/070333.
"The OpenFlow Switch Consortium" <http://www.openflowswitch.org/> [Non-Patent Literature 2] "OpenFlow Switch Specification Version 1.0.0 (Wire Protocol 0x01) Dec. 31, 2009" <http://www.openflowswitch.org/documents/openflow-spec-v1.0.0.pdf>.
Akio Iijima, "Cloud Computing Jidai no datacenter to Network no Sho Energy Gijutsu", NEC Technical Journal, vol. 62, No. 3, Sep. 25, 2009, vol. 62, pp. 117-120.
Chinese Office Action dated Nov. 3, 2014 with an English translation thereof.
Extended European Search Report dated Oct. 29, 2015 of corresponding EP Application No. 11823591.0.
Nick McKeown, et al., "OpenFlow: Enabling Innovation in Campus Networks", Mar. 14, 2008, p. 1-6, XP55002028, Retrieved from the Internet: URL: http://www.openflow.org/documents/openflow-wp-latest.pdf.

* cited by examiner

NETWORK SYSTEM AND NETWORK MANAGING METHOD

TECHNICAL FIELD

The present invention relates to a network system, and in particular, to a network system using a CU (C: Control plane/U: User plane) separate-type network.

BACKGROUND ART

A system in which a user plane such as a switch and a terminal is controlled by a control plane such as an external controller is called as a system of CU (C: Control plane/U: User plane) separate-type architecture. A network configured on the basis of the CU separate-type architecture is called as a CU separate-type network.

As an example of the CU separate-type network, an OpenFlow network using an OpenFlow technique is exemplified which controls switches from a controller to perform a route control of the network.

Explanation of OpenFlow Network

In the OpenFlow network, a controller such as an OFC (OpenFlow Controller) manipulates a flow table of a switch such as an OFC (OpenFlow Switch) to control the behavior of the switch. The controller and the switch are connected through a secure channel-in which the controller controls the switch by using a control message compliant with an Open-Flow protocol.

Switches in the OpenFlow network configure an Open-Flow network and are referred to as edge switches or core switches under control of the controller. A series of transfer processes of a packet from reception of the packet at an input side edge switch to transmission of the packet at an output side edge switch in the OpenFlow network is referred to as a flow.

The flow table is a table in which a flow entry is registered that defines a predetermined processing content (action) to be performed on the packet (communication data) that matches a predetermined matching condition (rule).

The rule of the flow entry is distinguishable and defined based on various combinations of any or all of a destination address, a source address, a destination port, and a source port included in a header region of the packet in a protocol layer. It should be noted that the addresses described above are supposed to include a MAC (Media Access Control) address and an IP (Internet Protocol) address. Also, in addition to the above, information on an ingress port can also be used as a part of the rule of the flow entry.

The action of the flow entry indicates an action of "output to a specific port", "discard", or "rewrite of a header". For example, if identification information of an output port (an output port number) is indicated for the action of the flow entry, the switch outputs a packet to a port corresponding to the identification information, whereas, if the identification information of the output port is not indicated, the switch discards the packet. Alternatively, if header information is indicated for the action of the flow entry, the switch rewrites a header of the packet on the basis of the header information.

The switch in the OpenFlow network performs an action defined in the flow entry on a packet group (a packet sequence) meeting a rule of the flow entry.

Details of the OpenFlow technique have been described in Non-Patent Literatures 1 and 2.

When a virtual machine (VM) operates on a server under a switch in a network system using the OpenFlow technique, the controller is requested to receive an ARP (Address Resolution Protocol) request from the generated virtual machine through the switch, every time the virtual machine is generated on the server under the switch. Moreover, the controller is requested to identify identification information and location information (server information) of the virtual machine, and set a flow entry for a packet destined to the virtual machine to the switch. For this reason, such processes are concentrated on the controller and therefore a large load is imposed on the controller.

For example, when tens of virtual machines operate on each of thousands of physical servers connected to a network, tens of thousands of to hundreds of thousands of virtual machines in total are in the operation state. A load imposed on the controller is enormous when the controller receives the APR request from not the physical servers but each of the virtual machines, identifies the identification information and location information of the virtual machine, and sets a flow entry for a packet destined to the virtual machine to the switch on the basis of such pieces of information.

CITATION LIST

[Non-Patent Literature 1] "The OpenFlow Switch Consortium" <http://www.openflowswitch.org/>

[Non-Patent Literature 2] "OpenFlow Switch Specification Version 1.0.0 (Wire Protocol 0x01) Dec. 31, 2009" <http://www.openflowswitch.org/documents/openflow-spec-v1.0.0.pdf>

SUMMARY OF THE INVENTION

An object of the present invention is to provide a network system in which a controller manages identification information of a virtual machine which operates on a server under a switch and identification information of the server and sets a flow entry to the switch in parallel to generation of the virtual machine and an operation of migration.

The network system according to the present invention includes a management system configured to manage a network, a controller configured to retain information of a server in accordance with to a setting from the management system, and a switch configuring the network, and configured to register a flow entry in which a rule and an action are defined, according to a control from the controller to uniformly control a packet as a flow, and to execute the action of the flow entry to the packet which matches the rule of the flow entry. The controller calculates a communication route to the server based on the set information of the server, and sets the flow entry for the packet destined the server to the switch.

The controller according to the present invention includes a storage section which retains information of a server which is set by a management system managing a network, and a processing section which calculates a communication route to the server based on the set information of the server, and sets the flow entry for the packet destined the server to a switch which configures the network, and transfers a reception packet according to the set flow entry.

In a network managing method according to the present invention, a computer functioning as a controller retains information of a server set from a management system which manages a network. Also, the controller calculates a communication route to the server based on the set information of the server, and sets the flow entry for a packet destined to the server to a switch which configures the network and transfers a reception packet according to the set flow entry.

A program according to the present invention is a program which makes a computer execute: retaining information of a server set from a management system which manages a network, calculating a communication route to the server based on the set information of the server, and setting the flow entry for a packet destined to the server to a switch which configures the network and transfers a reception packet according to the set flow entry. It should be noted that the program according to the present invention can be stored in a storage unit and a storage medium.

In this way, in the network system using the OpenFlow technique, when a virtual machine is generated on a server under a switch, a load imposed on a controller can be reduced.

DESCRIPTION OF EXEMPLARY EMBODIMENTS

The present invention relates to a CU separate-type network. Here, the OpenFlow network, which is one of the CU separate-type networks, will be described as an example. It should be noted that the present invention is not limited to the OpenFlow network.

[First Exemplary Embodiment]

A first exemplary embodiment of the present invention will be described with reference to the attached drawings.
(System Configuration)

Figure 1:
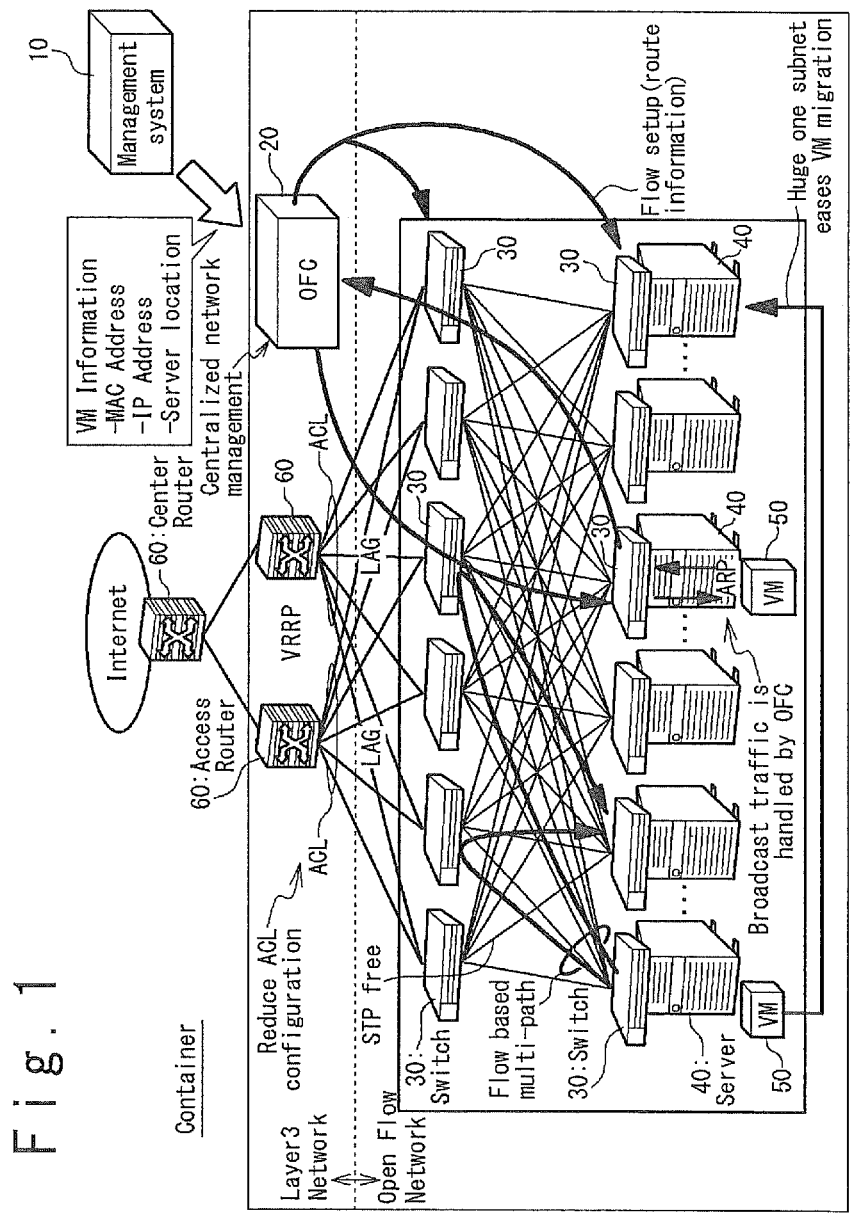
FIG. 1 is a conceptual diagram illustrating a configuration example of a network system according to the present invention.

As illustrated in FIG. 1, a network system according to the present invention includes a management system 10, a controller (OFC: OpenFlow controller) 20, a switch 30, servers 40, a virtual machine (VMs) 50, and a router 60.

There may be a plurality of management systems 10, a plurality of controller 20, a plurality of switches 30, a plurality of servers 40, a plurality of virtual machines 50, and a plurality of routers 60. That is, at least one management system 10, one controller 20, one switch 30, one server 40, one virtual machine 50, and one router 60 are supposed to be present.

The management system 10 manages nodes or services in the CU separate-type network. The management system 10 manages the switches, the routers, and the servers. For example, the management system 10 manages the network by using hardware and software configurations for realizing an NMS (Network Management System) or an EMS (Element Management System). Also, the management system 10 sets a virtual MAC address and a virtual IP address of each of the virtual machines, and a physical MAC address of a server on which the virtual machines operate, to the controller 20 as virtual machine information (VM information). Here, the virtual machine information is supposed to be set in the management system 10 in advance.

It should be noted that the virtual MAC address, the virtual IP address, the physical MAC address are only an example of location information on the network. Actually, the location information is not limited to the MAC address or IP address, but is enough if it is information for identifying the virtual machine or the server.

The controller 20 controls the CU separate-type network. The controller 20 performs a route control of the switches 30 according to setting by the management system 10. Here, it is supposed that the controller 20 is a controller compliant with the OpenFlow technique, and a flow entry for a packet destined to the server is set to the switch on the basis of the physical MAC address of the server notified from any of the switches 30.

Figure 2:
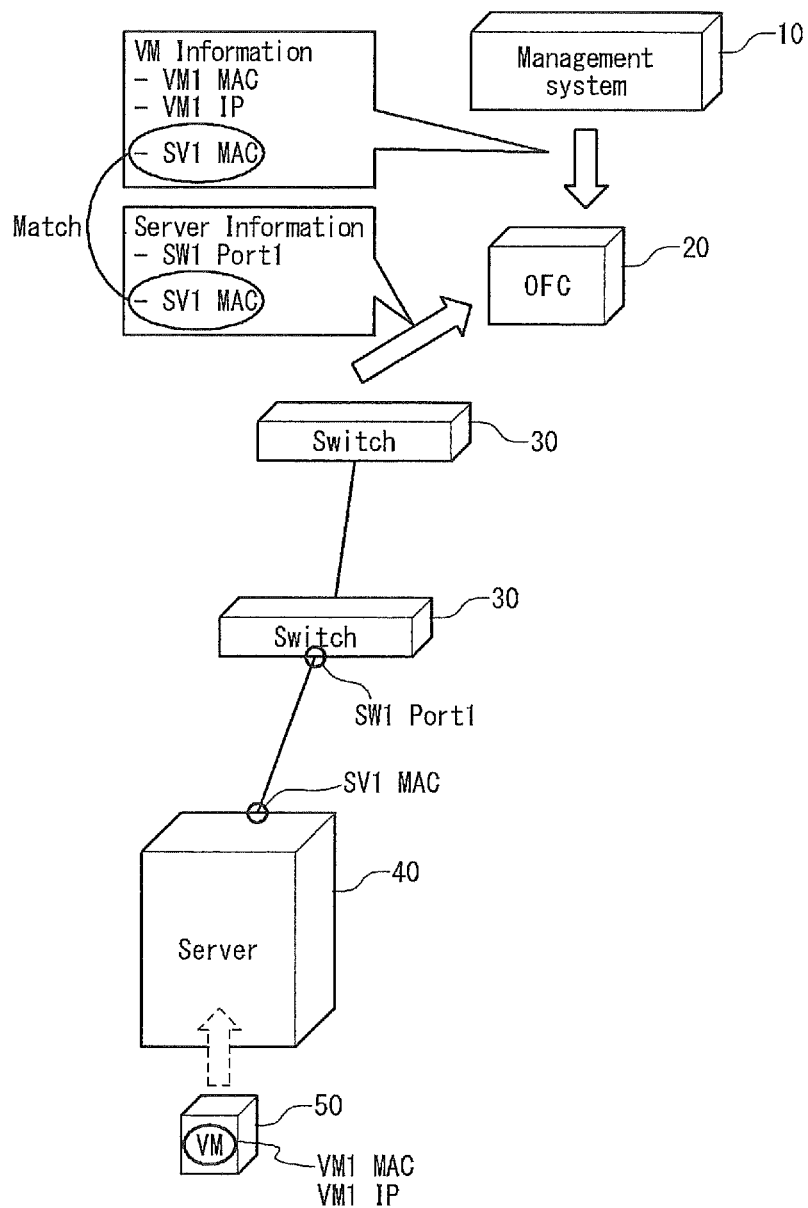
FIG. 2 is a diagram showing a process of checking preset information and actually detected information in the present invention.

Also, as the virtual machine information, the controller 20 retains a table in which the virtual MAC address and the virtual IP address of each of the virtual machines and the physical MAC address of the server on which the virtual machines operate are related to each other, according to the settings by the management system 10. As illustrated in FIG. 2, the controller 20 checks the physical MAC address of the server set by the management system 10 and the physical MAC address of the server notified from the switch 30, and, if the physical MAC addresses match with each other, relates both of them to each other. Also, the controller 20 sets a flow entry for the packet destined to the virtual machine to the switches 30 on the basis of the virtual MAC address and virtual IP address of the virtual machine on the server.

Referring to FIG. 2, the controller 20 checks the physical MAC address ("SV1 MAC" of "VM information") of the server set by the management system 10 and the physical MAC address ("SV1 MAC" of "Server Information") of the server notified from the switch 30. Here, the physical MAC addresses match with each other, and therefore the controller 20 relates the physical MAC addresses to each other, and sets the flow entry for the packet destined to the virtual machine to the switches 30 on the basis of the virtual MAC address and virtual IP address ("VM1 MAC" and "VM1 IP" of "VM information") of the virtual machine on the server.

Also, when a change of the physical MAC address of the server on which the virtual machine operates is notified through the setting by the management system 10, the controller 20 sets the change of the flow entry for the packet destined to the virtual machine to the switch 30. For example, when the switches 30 on the current route are changed due to the change of the physical MAC address of the server, the controller 20 deletes the flow entry, which has been set to the switches 30 on the current route, for the packet destined to the virtual machine, and sets the flow entry for the packet destined to the virtual machine to switches 30 corresponding to a server after the change.

Further, when an ARP (Address Resolution Protocol) request is sent from the virtual machine after the flow entry for the packet destined to the virtual machine is set to the switches 30, the controller receives the ARP request from the virtual machine through the switches 30, and refers to the virtual MAC address and virtual IP address of the virtual machine, which are retained as the virtual machine information. Thus, the controller 20 sends an ARP response to the virtual machine on the basis of relevant information.

Each of the switches 30 performs a packet transfer in the CU separate-type network. Here, each of the switches 30 is a switch compliant with the OpenFlow technique, and supposed to retain a flow table. When any of the switches 30 is connected with the server 40 under the control of it, the switch 30 detects the physical MAC address of the server 40 at the time of receiving the ARP request from the server 40, and notifies the physical MAC address of the server 40 to the controller 20. Alternatively, the switch 30 may notify the physical MAC address of the server to the controller 20, by receiving the ARP request inquiring the physical MAC address of the server 40 from the controller 20, transferring the ARP request to the server 40, and transferring the ARP response from the server 40 to the controller 20. This is because it is considered that the number of physical servers is small as compared with the number of virtual servers, so that a load imposed on the controller is only relatively small, if a process of inquiring identification information of the physical server is only performed. At this time, the switch 30 notifies a port number of the switch 30 connected to the server to the controller 20 in addition to the physical MAC address of the server, as the server information. Thus, the controller 20 can recognize that the server 40 is under control of the switch 30.

Each of the servers 40 is a physical server under the control of a corresponding switch 30, and provides service in the CU separate-type network. Here, each of the servers 40 manages corresponding virtual machines (VM) 50. The virtual machine (VM) 50 can operate on the server 40. For example, the server 40 generates the virtual machine 50 by a virtual machine monitor (VMM) such as a hypervisor to make the virtual machines 50 operate. It should be noted that a role and application of the server 40 are not limited to those in the above example.

Each of the virtual machines 50 is a virtual machine (VM) operating on a corresponding server 40. A set of a virtual MAC address and a virtual IP address for each of the virtual machines 50 is one of sets of virtual MAC addresses and virtual IP addresses of the virtual machines retained by the management system 10.

(Supplement)

In this case, the management system 10 may manage operating statuses of all of the virtual machines, and simultaneously issue instructions for generating the virtual machines 50 to the servers 40 and notify virtual machine information to the controller 20.

Also, when any of the servers 40 generates a virtual machine 50 to make it operate, the server 40 may directly or indirectly notify the management system 10 of a virtual MAC address and virtual IP address of the virtual machine 50, and a physical MAC address thereof.

The router 60 is a relay unit that connects the switches 30 and an external network (such as the Internet). In FIG. 1, as the router 60, an access router and a center router are illustrated. The access router is a relay unit that connects the switches 30 and the center router. The center router is a relay unit that connects the access routers and the external network.

(Exemplification of Hardware)

Specific hardware examples for realizing the network system according to the present invention will be described below.

As an example of each of the management system 10, the controller 20, and the servers 40, a computer such as a PC (personal computer), appliance, workstation, mainframe, and supercomputer is exemplified. As another example of each of the servers 40, a mobile phone, a smart phone, a smart book, a car navigation system, a portable game machine, a home-use game machine, a gadget (electronic device), a bidirectional television, a digital tuner, a digital recorder, an information home appliance, a POS (Point of Sale) terminal, an OA (Office Automation) device, an intelligent copier, a digital signage, or the like is exemplified. Also, each of the management system 10, controller 20, and servers 40 may be an extension board mounted in a computer or the like, or a virtual machine (VM) constructed on a physical machine. The management system 10, controller 20, and servers 40 may be mounted in a moving object such as a vehicle, ship, or airplane.

As an example of each of the switches 30, a network switch or the like is exemplified. Also, as an example of each of the routers 60, a general router or the like is exemplified. As another example of each of the switches 30 and routers 60, a proxy, a gateway, a firewall, a load balancer, a bandwidth controller/security monitoring controller (gatekeeper), a base station, an access point (AP), a communication satellite (CS), or a computer having a plurality of communication ports is exemplified.

As an example of the network connecting the management system 10, the controller 20, the switches 30, the servers 40, and the routers 60 to one another, a LAN (Local Area Network) is exemplified. As another example, the Internet, a wireless LAN, a WAN (Wide Area Network), a backbone, a cable television (CATV) line, a fixed phone network, a mobile phone network, the WiMAX (IEEE 802.16a), the 3G (3rd Generation), a leased line, the IrDA (Infrared Data Association), the Bluetooth (registered trademark), a serial communication line, data bus, or the like is also exemplified.

Although not illustrated, each of the management system 10, the controller 20, the switches 30, the servers 40, and the routers 60 is realized by a processor that operates on the basis of a program for executing a predetermined process, a memory that stores the program and various types of data, and a communication interface (I/F).

As an example of the above processor, a CPU (Central Processing Unit), a microprocessor, a network processor (NP), a microcontroller, a semiconductor integrated circuit (IC) having a dedicated function, or the like is exemplified.

As an example of the above memory, a semiconductor storage device such as a RAM (Random Access Memory), a ROM (Read Only Memory), an EEPROM (Electrically Erasable and Programmable Read Only Memory), or a flash memory, an auxiliary storage device such as an HDD (Hard Disk Drive) or an SSD (Solid State Drive), a removable disk such as a DVD (Digital Versatile Disk), a storage medium such as an SD (Secure Digital) memory card or the like is exemplified. Further, a buffer or a register is also exemplified. Alternatively, a storage device using a DAS (Direct Attached Storage), an FC-SAN (Fiber Channel-Storage Area Network), a NAS (Network Attached Storage), an IP-SAN (IP-Storage Area Network), or the like is also exemplified.

As an example of the above communication interface, a semiconductor integrated circuit such as a board (mother board or I/O board) corresponding to network communication, a network adaptor such as an NIC (Network Interface Card) or a similar expansion card, a communication device such as an antenna, a communication port such as a connecting port (connector), or the like is exemplified.

It should be noted that an internal configuration that realizes processing by each of the management system 10, the controller 20, the switches 30, the servers 40, and the routers 60 may be a module, a component, or a dedicated device, or alternatively an activating (invoking) program therefor.

It should be noted that, in practice, the present invention is not limited to any of such examples.

(Registering Process of Setting Information)

Figure 3:
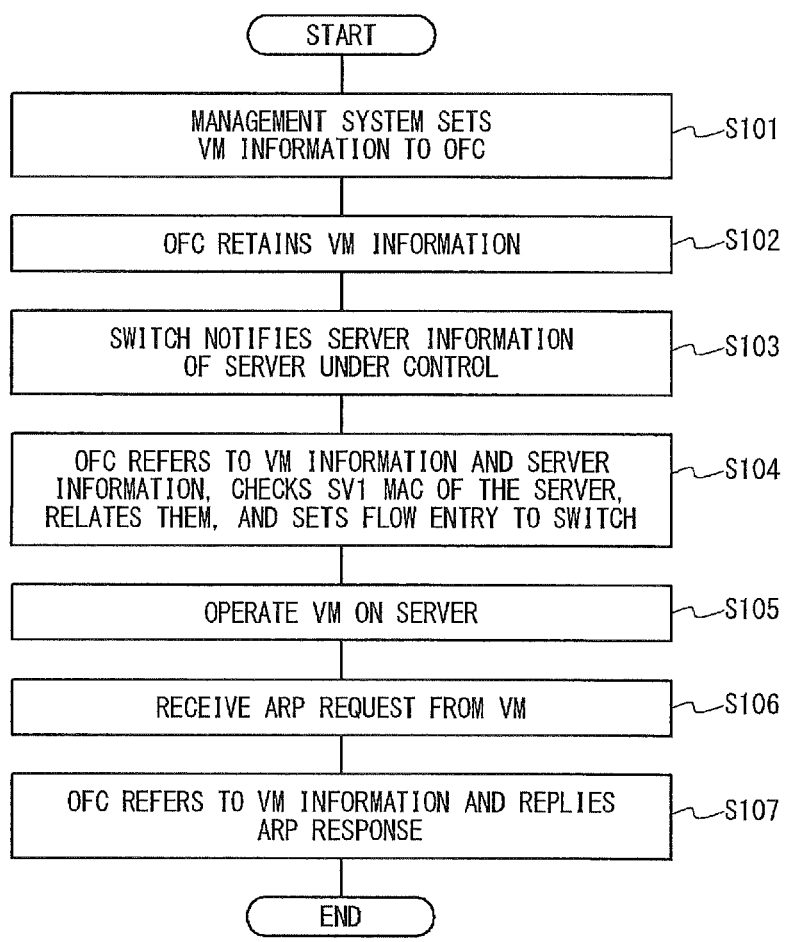
FIG. 3 is a flowchart illustrating a registering process of setting information in the present invention.

Referring to FIG. 3, details of a registering process of setting information in the present exemplary embodiment will be described.

(1) Step S101

The management system 10 sets to the controller 20 as virtual machine (VM) information, the virtual MAC address and virtual IP address of the virtual machine 50 and the physical MAC address of the server 40 on which the virtual machine 50 operates.

(2) Step S102

The controller 20 retains as the virtual machine information, the virtual MAC address and virtual IP address of the virtual machine 50 and the physical MAC address of the server 40 on which the virtual machine 50 operates, on the basis of the settings by the management system 10.

(3) Step S103

When any of the switches 30 is in a connection state with the server 40 under the switch and receives the ARP request from the server 40, the switch 30 detects the physical MAC address of the server 40, and notifies the physical MAC address of the server 40 to the controller 20. At this time, the controller 20 sets a flow entry for a packet destined to the server 40 to the switch 30 on the basis of the physical MAC address of the server 40 by using the OpenFlow technique.

(4) Step S104

The controller 20 checks the retained physical MAC address of the server and the physical MAC address of the server notified from the switch 30, and relates the physical MAC addresses to each other if the physical MAC addresses match to each other. Then, the controller 20 sets to the switch 30, the flow entry for the packet destined to the virtual machine 50 on the basis of the virtual MAC address and virtual IP address of the virtual machine 50 on the server.

(5) Step S105

The server 40 generates the virtual machine 50 by a virtual machine monitor (VMM) such as a hypervisor and makes it operate.

(6) Step S106

After the flow entry for the packet destined to the virtual machine 50 is set, the switch 30 receives the ARP request from the virtual machine 50. Here, the switch 30 transfers the ARP request from the virtual machine 50 to the controller 20.

(7) Step S107

The controller 20 receives the ARP request from the virtual machine 50 through the switch 30, and refers to the virtual machine information to send the ARP response back to the virtual machine 50.

(Changing Process of Setting Information)

Figure 4:
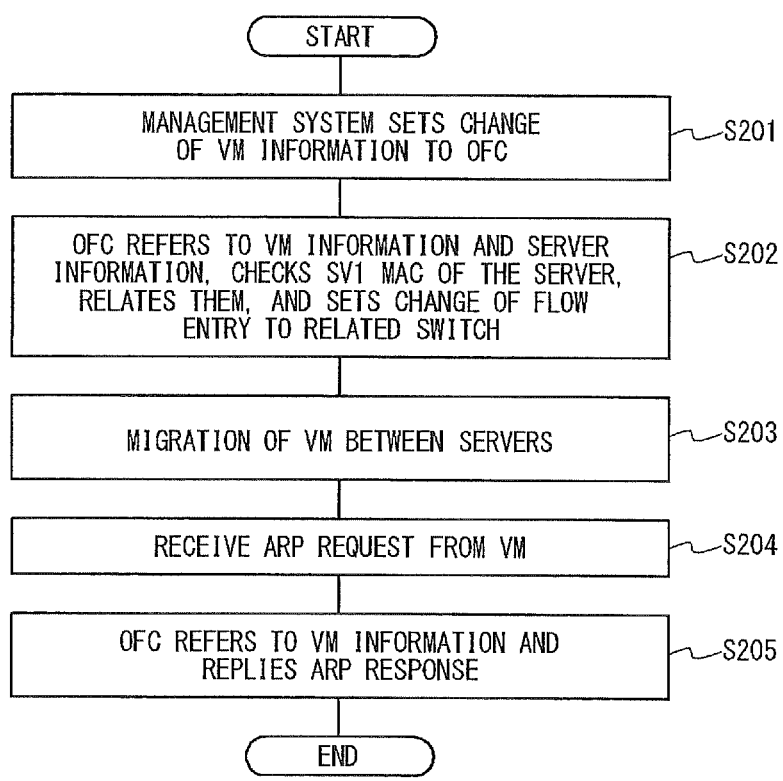
FIG. 4 is a flowchart illustrating a changing process of the setting information in the present invention.

Referring to FIG. 4, details of a changing process of setting information in the present exemplary embodiment will be described.

(1) Step S201

When the physical MAC address of the server on which the virtual machine 50 operates is changed, the management system 10 again sets the virtual MAC address and virtual IP address of the virtual machine and the physical MAC address of the server after the change, to the controller 20 as virtual machine (VM) information. At this time, the management system 10 may reset only the physical MAC address of the server to the controller 20 on the basis of content after the change.

(2) Step S202

When the change of the physical MAC address of the server 40 on which the virtual machine 50 operates, is notified on the basis of the settings by the management system 10, the controller 20 sets the change of the flow entry for the packet destined to the virtual machine 50 to the switch 30.

(3) Step S203

The virtual machine 50 migrates from the server 40 by a virtual machine (VMM) monitor such as a hypervisor.

(4) Step S204

The switch 30 corresponding to the server 40 as a migration destination of the virtual machine 50 receives the ARP request from the migrated virtual machine 50 after the flow entry for the packet destined to the virtual machine 50 is set. Here, the switch 30 transfers the ARP request from the virtual machine 50 to the controller 20.

(5) Step S205

The controller 20 receives the ARP request from the virtual machine 50 through the switch 30, and refers to the virtual machine information to send the ARP response back to the virtual machine 50.

(Configuration Example of Controller)

A configuration of the controller according to the present invention is represented as functional blocks on the basis of the above content.

Figure 5:
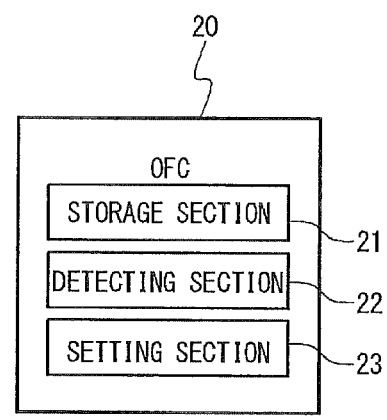
FIG. 5 is a functional block diagram illustrating a configuration example of a controller according to the present invention.

As illustrated in FIG. 5, the controller 20 according to the present invention is provided with a storage section 21, a detecting section 22, and a setting section 23.

The storage section 21 stores virtual machine information set by the management system 10, i.e., the virtual MAC address and virtual IP address of the virtual machine, and the physical MAC address of the server with the virtual machine operating thereon. In this case, the storage section 21 also stores the virtual MAC address and virtual IP address of the virtual machine 50, and the physical MAC address of the server 40 with the virtual machine 50 operating thereon.

The detecting section 22 detects the physical MAC address of the server 40 under the switch 30, through the switch 30. Here, the detecting section 22 detects the physical MAC address of the server 40 by receiving through the switch 30, a packet that includes the physical MAC address of the server 40 in a source address region of header information. In addition, the detecting section 22 may store the detected information in the storage section 21.

The setting section 23 checks the physical MAC address of the server set by the management system 10 and the physical MAC address of the server 40 detected through the switch 30, and relates the physical MAC addresses to each other, if the physical MAC addresses match to each other, and sets to the switch 30 a flow entry for a packet destined to the virtual machine 50 on the basis of the virtual MAC address and virtual IP address of the virtual machine 50 on the server 40.

The storage section 21, the detecting section 22, and the setting section 23 are realized by a processor driven on the basis of a program to execute a predetermined process, a memory that stores the program and various types of data, and a communication interface (I/F).

[Second Exemplary Embodiment]

In the following, a second exemplary embodiment of the present invention will be described.

In the first exemplary embodiment of the present invention, the switch 30 detects identification information of the server 40 under its control, and notifies the identification information of the server 40 to the controller 20. If the identification information of the server 40 set by the management system 10 and the identification information of the server 40 notified from the switch 30 match to each other, the controller 20 calculates a route for communication with the server 40, and sets a flow entry for a packet destined to the server 40, to the switch 30.

However, when it is previously known which server is present under which switch, and the identification information of the server 40 under the switch 30 is set from the management system 10 to the controller 20 as identification information of the server 40, it is not necessary for the controller 20 to check the identification information of the server 40 set by the management system 10 and the identification information of the server 40 notified from the switch 30. In this case, the controller 20 can calculate the route for communication with the server 40 on the basis of only the identification information of the server 40 set by the management system 10 without the notification of the identification information of the server 40 under the switch 30 from the switch 30, and can set the flow entry for the packet destined to the server 40 to the switch 30.

<Relationship Between Exemplary Embodiments>

It should be noted that the above respective exemplary embodiments may be carried out in combination. For example, when it is previously known which server is present under a switch regarding only a part of the switches, it is considered that any of the switches under which the server is previously known is applied with the method in the second exemplary embodiment, and a switch under which the server is not previously known is applied with the method in the first exemplary embodiment.

<Supplemental Notes>

Part or all of the above-described exemplary embodiments can also be described in the following supplemental notes. However, in practice, the present invention is not limited to any of the following supplemental notes.

(Supplemental Note 1)

A network system includes:

a controller in which identification information of a virtual machine, and identification information of a server on which the virtual machine operates are set; and a switch configured to detect identification information of a server under the switch, and notify the identification information of the server under the switch to the controller, wherein, when the set identification information of the server and the identification information of the server under the switch notified from the switch match to each other, the controller sets a flow entry for a packet destined to the virtual machine to the switch based on the identification information of the virtual machine on the server.

(Supplemental Note 2)

The network system according to Supplemental note 1, further includes a management system configured to set the identification information of the virtual machine and the identification information of the server on which the virtual machine operates, to the controller, wherein the controller sets a changed flow entry for the packet destined to the virtual machine to the switch, when a change of the identification information of the server on which the virtual machine operates, is notified from the management system during operation of the virtual machine.

(Supplemental Note 3)

A controller includes:

a storage part that retains identification information on a virtual machine, and identification information on a server that operates the virtual machine;

a detection part that, through a switch that transfers a received packet according to a set flow entry, detects identification information on a server under the switch; and a setting part that, upon the detected identification information on the server and the retained identification information on the server matching with each other, on a basis of the identification information on the virtual machine on the server, sets in the switch a flow entry for a packet destined to the virtual machine.

(Supplemental Note 4)

A network management method includes:

setting identification information of a virtual machine and identification information of a server which the virtual machine operates, to a controller;

detecting identification information of a server under a switch by the controller through the switch; and setting a flow entry for a packet destined to the virtual machine to the switch based on the detected identification information of the virtual machine on the server, when the set identification information on the server and the detected identification information of the server match to each other.

(Supplemental Note 5)

The network management method according to Supplemental note 4, further includes:

setting the identification information of the virtual machine and the identification information of the server on which the virtual machine operates, to the controller by a management system; and setting a changed flow entry for the packet destined to the virtual machine to the switch when a change of the identification information of the server on which the virtual machine operates, is notified from the management system to the controller during operation of the virtual machine.

(Supplemental Note 6)

A storage medium that stores a program which makes a computer to execute:

retaining identification information of a virtual machine, and identification information of a server on which the virtual machine operates;

detecting identification information of a server under the switch through a switch that transfers a reception packet based on a set flow entry; and setting a flow entry for a packet destined to the virtual machine on the server to the switch based on the identification information of the virtual machine on the server, when the detected identification information of the server and the retained identification information of the server match to each other.

<Features of the Present Invention>

As described above, the present invention targets the CU separate-type network such as the OpenFlow network. It should be noted that the OpenFlow network is only an example. Actually, the present invention can also target a network in which a route control other than "flow control using the OpenFlow technique" is performed.

In the present invention, in parallel to the generation and migration of a virtual machine, a flow entry is set to a switch. That is, the setting of the flow entry to the switch is completed prior to the start of communication of the virtual machine.

In the present invention, the identification information of a virtual machine and the identification information of a server on which the virtual machine operates, are set to the controller by an external management system. The controller can grasp the identification information of the virtual machine operating on the server through a switch, by detecting the identification information of the server under the switch, and by checking the detected information with the set identification information of the server. For this reason, it is not necessary for the controller to inquire the identification information of the virtual machine every time a virtual machine is generated. Accordingly, a load of the controller is greatly reduced, as compared with a case where the present invention is not applied.

In the above, the exemplary embodiments of the present invention have been described in detail. However, in practice, the present invention is not limited to any of the above-described exemplary embodiments, and any modification without departing from the scope of the present invention is also included in the present invention.

It should be noted that this application claims a priority based on Japanese Patent Application No. JP 2010-202444. The disclosure thereof is incorporated herein by reference.

The invention claimed is:

1. A network system, comprising:
   a management system configured to manage a network;
   a switch on said network, said switch configured to include a flow entry in which a rule and an action are defined, to execute the action of the flow entry to a target packet; and
   a controller configured to retain information of a server under said switch based on a setting by said management system,
   wherein said server is configured to include a virtual machine being operable on said server,
   wherein said management system is configured to include information of said virtual machine, and to provide said information of said virtual machine to said controller,
   wherein said switch is configured to detect information of said server, and to notify the information of said server to said controller,
   wherein said controller is further configured:
     to calculate a communication route to said server based on said information of said server;
     to relate said information of said virtual machine to said information of said server, based on said setting by said management system;
     to retain a relation between said information of said virtual machine and said information of said server;
     to check said information of said virtual machine with said information of said server; and
     to set a new flow entry for a packet destined to said virtual machine to said switch based on said information of said virtual machine when said information of said virtual machine matches said information of said server,
   wherein said server generates said virtual machine which operates on said server,
   wherein, after the new flow entry for the packet destined to the virtual machine is set, said switch receives an Address Resolution Protocol (ARP) request from said virtual machine,
   wherein said switch transfers the ARP request from the virtual machine to the controller, and
   wherein the controller receives the ARP request from the virtual machine through the switch and refers to said information of said virtual machine to send the ARP response back to the virtual machine.

2. The network system according to claim 1, wherein said controller sets a changed flow entry for the packet destined to said virtual machine to said switch, when a change of the server information of said server on which said virtual machine operates is notified from said management system while said virtual machine operates.

3. The network system according to claim 1, wherein said management system sets to the controller as the virtual machine information, a virtual MAC address, a virtual IP address of the virtual machine, and a physical MAC address of the server on which the virtual machine operates.

4. The network system according to claim 1, wherein the management system manages the network by using hardware and software configurations for realizing an NMS (Network Management System) or an EMS (Element Management System).

5. The network system according to claim 1, wherein the management system sets a virtual MAC address, a virtual IP address of the virtual machine, and a physical MAC address of a server on which the virtual machines operate to the controller, as the virtual machine information.

6. The network system according to claim 5, wherein the virtual machine information is set in advance in the management system.

7. The network system according to claim 1, wherein the server generates said virtual machine by a virtual machine monitor.

8. The network system according to claim 7, wherein the virtual machine monitor comprises a hypervisor.

9. A controller, comprising:
   means for storing information of a server set by a management system which manages a network provided with a switch,
   wherein said switch is configured to include a flow entry in which a rule and an action are defined, to execute the action of the flow entry to a target packet,
   wherein the controller is configured to retain information of a server under said switch based on a setting by said management system,
   wherein said server is configured to include a virtual machine being operable on said server,
   wherein said management system is configured to include information of said virtual machine and to provide said information of said virtual machine to said controller,
   wherein said switch is configured to detect information of said server and to notify the information of said server to said controller,
   wherein said controller is further configured:
     to calculate a communication route to said server based on said information of said server;
     to relate said information of said virtual machine to said information of said server, based on said setting by said management system;
     to retain a relation between said information of said virtual machine and said information of said server;
     to check said information of said virtual machine with said information of said server; and
     to set a new flow entry for a packet destined to said virtual machine to said switch based on said information of said virtual machine when said information of said virtual machine matches said information of said server,
   wherein said server generates said virtual machine which operates on said server,
   wherein, after the new flow entry for the packet destined to the virtual machine is set, said switch receives an Address Resolution Protocol (ARP) request from said virtual machine,
   wherein said switch transfers the ARP request from the virtual machine to said controller, and
   wherein said controller receives the ARP request from the virtual machine through the switch and refers to said information of said virtual machine to send the ARP response back to the virtual machine.

10. The controller according to claim 9, further comprising means for setting a changed flow entry for the packet destined to said virtual machine to said switch, when a change of the information of said server on which said virtual machine operates is notified from said management system while said virtual machine operates.

11. A network managing method which is executed by a computer, said network managing method comprising:
  executing an action of a flow entry to a target packet by a switch on said network, said switch being configured to include the flow entry in which a rule and the action are defined; and
  retaining, by a controller, information of a server under said switch which is set by a management system which manages a network,
  wherein said server is configured to include a virtual machine being operable on said server,
  wherein said management system is configured to include information of said virtual machine and to provide said information of said virtual machine to said controller,
  wherein said switch is configured to detect information of said server and to notify the information of said server to said controller,
  wherein said controller is configured:
    to calculate a communication route to said server based on said information of said server;
    to relate said information of said virtual machine to said information of said server, based on said setting by said management system;
    to retain a relation between said information of said virtual machine and said information of said server;
    to check said information of said virtual machine with said information of said server; and
    to set a new flow entry for a packet destined to said virtual machine to said switch based on said information of said virtual machine when said information of said virtual machine matches said information of said server,
  wherein said server generates said virtual machine which operates on said server,
  wherein, after the new flow entry for the packet destined to said virtual machine is set, said switch receives an Address Resolution Protocol (ARP) request from said virtual machine,
  wherein said switch transfers the ARP request from the virtual machine to said controller, and
  wherein said controller receives the ARP request from the virtual machine through the switch and refers to said information of said virtual machine to send the ARP response back to the virtual machine.

12. The network managing method according to claim 11, further comprising:
  setting a changed flow entry for the packet destined to said virtual machine to said switch, when a change of the information of said server on which said virtual machine operates is notified from said management system while said virtual machine operates.

13. A non-transitory storage medium which stores a program to make a computer execute:
  conducting an action of a flow entry to a target packet by a switch on said network, said switch being configured to include the flow entry in which a rule and the action are defined; and
  retaining, by a controller, information of a server under said switch which is set from a management system which manages a network,
  wherein said server is configured to include a virtual machine being operable on said server,
  wherein said management system is configured to include information of said virtual machine and to provide said information of said virtual machine to said controller,
  wherein said switch is configured to detect information of said server and to notify the information of said server to said controller,
  wherein said controller is configured:
    to calculate a communication route to said server based on said information of said server;
    to relate said information of said virtual machine to said information of said server, based on a setting by said management system;
    to retain a relation between said information of said virtual machine and said information of said server;
    to check said information of said virtual machine with said information of said server; and
    to set a new flow entry for a packet destined to said virtual machine to said switch based on said information of said virtual machine when said information of said virtual machine matches said information of said server,
  wherein said server generates said virtual machine which operates on said server,
  wherein, after the new flow entry for the packet destined to said virtual machine is set, said switch receives an Address Resolution Protocol (ARP) request from said virtual machine,
  wherein said switch transfers the ARP request from the virtual machine to said controller, and
  wherein said controller receives the ARP request from the virtual machine through the switch and refers to said information of said virtual machine to send the ARP response back to the virtual machine.

* * * * *